US012596994B2

(12) United States Patent    (10) Patent No.:   US 12,596,994 B2

Piyush et al.      (45) Date of Patent:     Apr. 7, 2026

(54) DISCOVERABLE COLLABORATION TEAMS

(71) Applicant: Dropbox, Inc., San Francisco, CA (US)

(72) Inventors: Pranav Piyush, San Francisco, CA (US); Zach Johnston, San Francisco, CA (US); Alexander Shtuchkin, San Francisco, CA (US); Iolanthe Chronis, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 193 days.

(21) Appl. No.: 18/456,975

(22) Filed: Aug. 28, 2023

(65) Prior Publication Data

US 2023/0410053 A1     Dec. 21, 2023

Related U.S. Application Data

(63) Continuation of application No. 14/986,199, filed on Dec. 31, 2015, now abandoned.

(51) Int. Cl.
*G06Q 10/10*      (2023.01)
*H04L 67/306*     (2022.01)

(52) U.S. Cl.
CPC ......... *G06Q 10/103* (2013.01); *H04L 67/306* (2013.01)

(58) Field of Classification Search
CPC ............................ G06Q 10/103; H04L 67/306
See application file for complete search history.

(56) References Cited

U.S. PATENT DOCUMENTS

| | | | |
|---|---|---|---|
| 7,890,583 B2 * | 2/2011 | Castro | H04L 12/1822 |
| | | | 715/755 |
| 7,904,322 B2 * | 3/2011 | Gauger | G06Q 10/103 |
| | | | 705/7.13 |
| 8,161,108 B2 | 4/2012 | Choi et al. | |
| 8,161,120 B2 | 4/2012 | Tan et al. | |
| 8,355,955 B1 * | 1/2013 | Mirchandani | G06Q 30/0255 |
| | | | 705/26.1 |
| 8,806,356 B2 | 8/2014 | Mccormack et al. | |
| 8,868,605 B2 | 10/2014 | Kuruganti et al. | |
| 8,892,670 B2 | 11/2014 | Chakravarthy et al. | |
| 8,977,661 B2 | 3/2015 | Cidon et al. | |
| 9,177,347 B2 * | 11/2015 | Jackson | H04L 67/535 |

(Continued)

OTHER PUBLICATIONS

Draghici et al., "Teamwork: a Decentralized, Secure and Portable Team Management System", 2013, IEEE 12th International Symposium on Parallel and Distributed Computing, pp. 182-189 (Year: 2013).*

(Continued)

*Primary Examiner* — Yingying Zhou

(74) *Attorney, Agent, or Firm* — Keller Preece PLLC

(57) ABSTRACT

Disclosed are systems, methods, and non-transitory computer-readable storage media for implementing discoverable collaboration teams. In some embodiments, a user of a content management system can create a team account within the content management system. The team account can be associated with a domain of the user (now administrator) of the team account. The domain can be an email domain, company name, or some other identifier or characteristic of the user that might be shared with other users. The administrator can specify discoverability settings for the team that allow other content management system users associated with the domain to automatically discover and/or join the team account.

18 Claims, 11 Drawing Sheets

(56) References Cited

U.S. PATENT DOCUMENTS

| | | | | |
|---|---|---|---|---|
| 9,294,485 B2 * | 3/2016 | Allain | | H04L 63/104 |
| 9,495,364 B2 | 11/2016 | Savage et al. | | |
| 9,565,232 B2 * | 2/2017 | Chen | | H04L 67/1095 |
| 9,607,316 B2 * | 3/2017 | Mirchandani | | G06Q 30/02 |
| 9,705,967 B2 * | 7/2017 | Savage | | H04L 67/52 |
| 9,842,312 B1 * | 12/2017 | Rosati | | G06Q 10/1053 |
| 2002/0078150 A1 * | 6/2002 | Thompson | | H04L 67/306 |
| | | | | 709/227 |
| 2004/0261013 A1 * | 12/2004 | Wynn | | G06Q 10/10 |
| | | | | 715/201 |
| 2005/0097440 A1 * | 5/2005 | Lusk | | G06Q 10/10 |
| | | | | 715/752 |
| 2006/0085245 A1 * | 4/2006 | Takatsuka | | G06Q 10/10 |
| | | | | 705/7.12 |
| 2007/0255712 A1 | 11/2007 | Mahoney et al. | | |
| 2009/0259591 A1 * | 10/2009 | Starostin | | H04L 63/10 |
| | | | | 705/59 |
| 2010/0306672 A1 * | 12/2010 | McEniry | | G06Q 30/02 |
| | | | | 709/227 |
| 2011/0119598 A1 * | 5/2011 | Traylor | | H04W 4/08 |
| | | | | 709/204 |
| 2011/0320374 A1 * | 12/2011 | Wang | | G06Q 10/103 |
| | | | | 705/319 |
| 2012/0197809 A1 * | 8/2012 | Earl | | G06Q 10/00 |
| | | | | 707/755 |
| 2012/0198559 A1 * | 8/2012 | Venkata Naga Ravi | | |
| | | | | G06F 21/62 |
| | | | | 726/26 |
| 2012/0284638 A1 * | 11/2012 | Cutler | | G06Q 10/00 |
| | | | | 715/751 |
| 2013/0227007 A1 * | 8/2013 | Savage | | G06Q 10/101 |
| | | | | 709/204 |
| 2013/0246475 A1 * | 9/2013 | Kuruganti | | G06F 16/27 |
| | | | | 707/785 |
| 2014/0025734 A1 | 1/2014 | Griffin et al. | | |
| 2014/0067944 A1 * | 3/2014 | Jackson | | G06Q 50/01 |
| | | | | 709/204 |
| 2014/0101094 A1 * | 4/2014 | Savage | | G06F 16/958 |
| | | | | 715/753 |
| 2014/0101251 A1 * | 4/2014 | Savage | | H04L 12/1822 |
| | | | | 709/204 |
| 2014/0143434 A1 * | 5/2014 | Sanche | | H04L 65/1069 |
| | | | | 709/228 |
| 2014/0181697 A1 * | 6/2014 | Kirigin | | G06F 3/048 |
| | | | | 715/758 |
| 2014/0194065 A1 * | 7/2014 | Hollick | | H04W 4/80 |
| | | | | 455/41.2 |
| 2014/0215551 A1 * | 7/2014 | Allain | | H04L 63/104 |
| | | | | 726/1 |
| 2014/0258418 A1 * | 9/2014 | Subramani | | H04L 67/1095 |
| | | | | 709/205 |
| 2014/0280602 A1 | 9/2014 | Quatrano | | |
| 2014/0317031 A1 * | 10/2014 | Babenko | | G06Q 30/0631 |
| | | | | 706/46 |
| 2014/0330776 A1 * | 11/2014 | Chen | | H04L 67/2842 |
| | | | | 707/610 |
| 2015/0100503 A1 * | 4/2015 | Lobo | | G06Q 10/103 |
| | | | | 705/301 |
| 2015/0363092 A1 * | 12/2015 | Morton | | G06F 3/04817 |
| | | | | 715/752 |
| 2016/0117134 A1 * | 4/2016 | Sasaki | | G06F 3/1296 |
| | | | | 358/1.15 |
| 2017/0116002 A1 * | 4/2017 | Kaushik | | G06F 9/4406 |
| 2017/0177166 A1 * | 6/2017 | Kockan | | A61B 3/0025 |
| 2017/0193447 A1 * | 7/2017 | Piyush | | H04L 67/306 |

OTHER PUBLICATIONS

Advisory Action from U.S. Appl. No. 14/986,199, mailed Dec. 31, 2019, 3 pages.
Final Office Action from U.S. Appl. No. 14/986,199, mailed Jan. 14, 2021, 15 pages.
Final Office Action from U.S. Appl. No. 14/986,199, mailed Oct. 1, 2019, 14 pages.
Non-Final Office Action from U.S. Appl. No. 14/986,199, mailed Jun. 26, 2020, 13 pages.
Notice of Allowance from U.S. Appl. No. 14/986,199, mailed May 30, 2023, 13 pages.
White R., "How Computers Work," Oct. 15, 2003, 23 pages.

* cited by examiner

CMS Server 230

CMS 106

Team 232

Licenses 234

Licensed Acct 236

Unlicensed Acct 237

Team Folder 238

User Account 240

Network 104

Admin Device 210

CMS Client 212

Managed File System 214

Team Folder 216

Member Device 250

CMS Client 252

Managed File System 254

Team Folder 256

300

302

Create a new Team!

Please verify your email address by clicking on the link we sent you.
Don't have a verification link? <u>Request a new one.</u>

304

Invite your coworkers, including:

306

(B) (F) (S)    Bob, Fred, Sarah...

Create a team

308

400

402

Create a your new team.

Give your team a name: | Awesome | 404

Invite team members: 406 bob@company.com; fred@company.com

Suggested team members: Bob, Fred, Sarah... 407

⦿ Automatically join users 408
◯ Users may request to join 410
◯ Invite only 412

| Create team | 414

500

Awesome team

| | Name | Status | Usage | Limit | License | |
|---|---|---|---|---|---|---|
| ⃝ | George Jetson george@company.com | Creator | 0.9 GB | 1 TB | Licensed | X |
| ⃝ | Bob Smith bob@company.com | Member | 0.2 GB | 1 TB | Licensed ▶ | X |
| ⃝ | Fred Jones fred@company.com | Member | 0.4 GB | 2 GB | Unlicensed ▶ | X |
| ⃝ | Sarah Rico sarah@company.com | Invited | ---- | ---- | | X |
| ⃝ | Ben Berliner ben@company.com | Approve | ---- | ---- | | X |

Members

Licenses allocated/purchased: 2/5    Buy

Invite members    Settings 502 504 506 508 510

Your coworkers created a team!

Please verify your email address by clicking on the link we sent you.
Don't have a verification link? <u>Request a new one</u>.

604

Coworkers on the team:

B F S Bob, Fred, Sarah...

606

Join Team

608

700

702 www.cms.com/home

Content Management System

| Name | Description | Size | Permissions |
|---|---|---|---|
| Awesome Team Folder | Limited Membership (2GB) | 0.9GB | Read-only |
| Folder 2 | | | |
| Folder 3 | | | |

FIG. 7

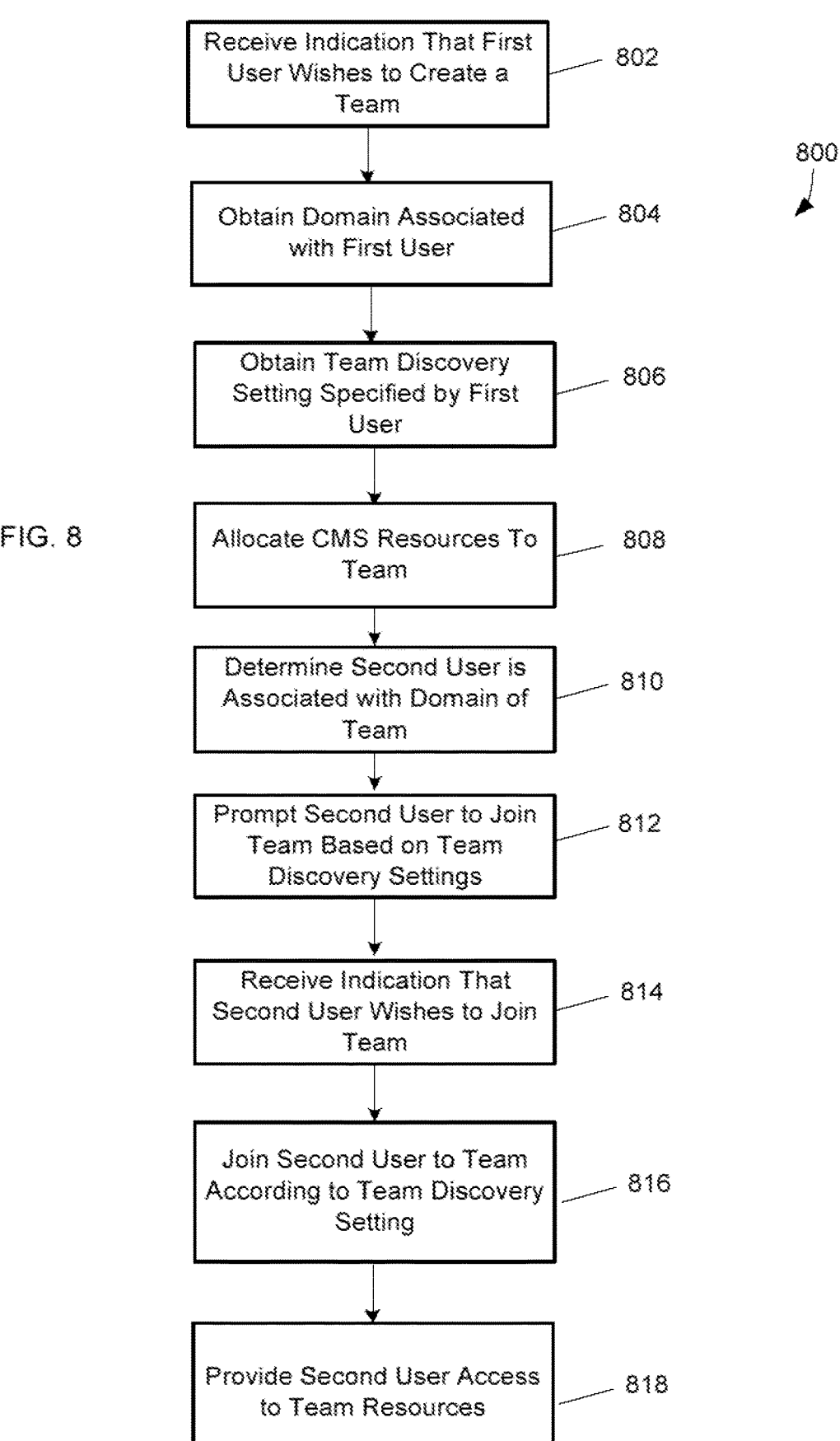

Receive Indication That First User Wishes to Create a Team — 802

Obtain Domain Associated with First User — 804

Obtain Team Discovery Setting Specified by First User — 806

Allocate CMS Resources To Team — 808

Determine Second User is Associated with Domain of Team — 810

Prompt Second User to Join Team Based on Team Discovery Settings — 812

Receive Indication That Second User Wishes to Join Team — 814

Join Second User to Team According to Team Discovery Setting — 816

Provide Second User Access to Team Resources — 818

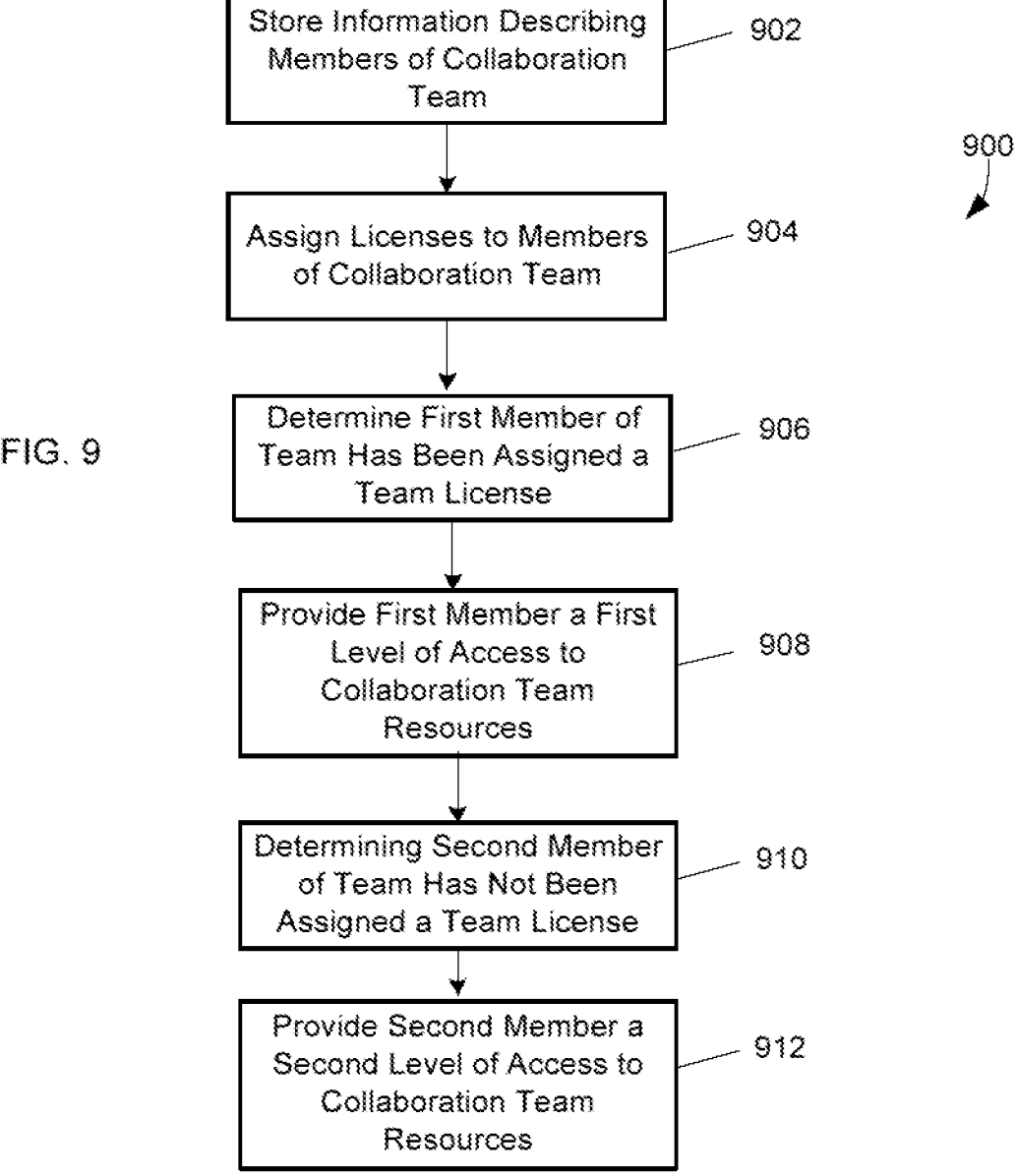

FIG. 9

Store Information Describing Members of Collaboration Team — 902

Assign Licenses to Members of Collaboration Team — 904

Determine First Member of Team Has Been Assigned a Team License — 906

Provide First Member a First Level of Access to Collaboration Team Resources — 908

Determining Second Member of Team Has Not Been Assigned a Team License — 910

Provide Second Member a Second Level of Access to Collaboration Team Resources — 912

900

DISCOVERABLE COLLABORATION TEAMS

CROSS-REFERENCE TO RELATED APPLICATION INFORMATION

This application is a continuation of U.S. patent application Ser. No. 14/986,199, filed Dec. 31, 2015, which is incorporated herein by reference in its entirety.

BACKGROUND

Modern computing systems allow for a more dynamic working environment. Employees of a business or members of a team no longer have to be in the same place at the same time to conduct business or collaborate on team projects. Different mechanisms for collaboration currently exist. However, getting all team members to use the same collaboration mechanism can be problematic.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for implementing discoverable collaboration teams. In some embodiments, a user of a content management system can create a team account within the content management system. The team account can be associated with a domain of the user (e.g., administrator) of the team account. The domain can be an email domain, company name, or some other identifier or characteristic of the user that might be shared with other users or potential members of the team. The administrator can specify discoverability settings for the team that allow other content management system users associated with the team domain to automatically discover and/or join the team account.

Disclosed are systems, methods, and non-transitory computer-readable storage media for implementing mixed collaboration teams. In some embodiments, a user of a content management system can create a team account within the content management system. The team account can be allocated resources of the content management system that allow team members to collaborate on content items (e.g., files, documents, etc.) managed by the content management system. The team can be allocated licenses to use the resources. The team licenses can be allocated to team members. The team can be a mixed team including licensed and unlicensed members. Licensed members can have a higher level of access to the team resources than unlicensed members. The team administrator can manage licenses allocated to team members. The team administrator can have different privileges with respect to licensed and unlicensed team members.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 5 illustrates an example graphical user interface for administering a collaboration team;

FIG. 7 illustrates an example graphical user interface for presenting a representation of a team folder in a user's account on content management system;

FIG. 8 is a flow diagram of an example process for implementing discoverable collaboration teams;

FIG. 9 is a flow diagram of an example process for implementing mixed teams on content management system;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for improving the ease with which team members can discover and join a collaboration teams and/or a collaboration environment. The disclosed technology addresses the need in the art for allowing collaboration team members access to team resources without require each team member to obtain a license to use the team resources.

Figure 1:
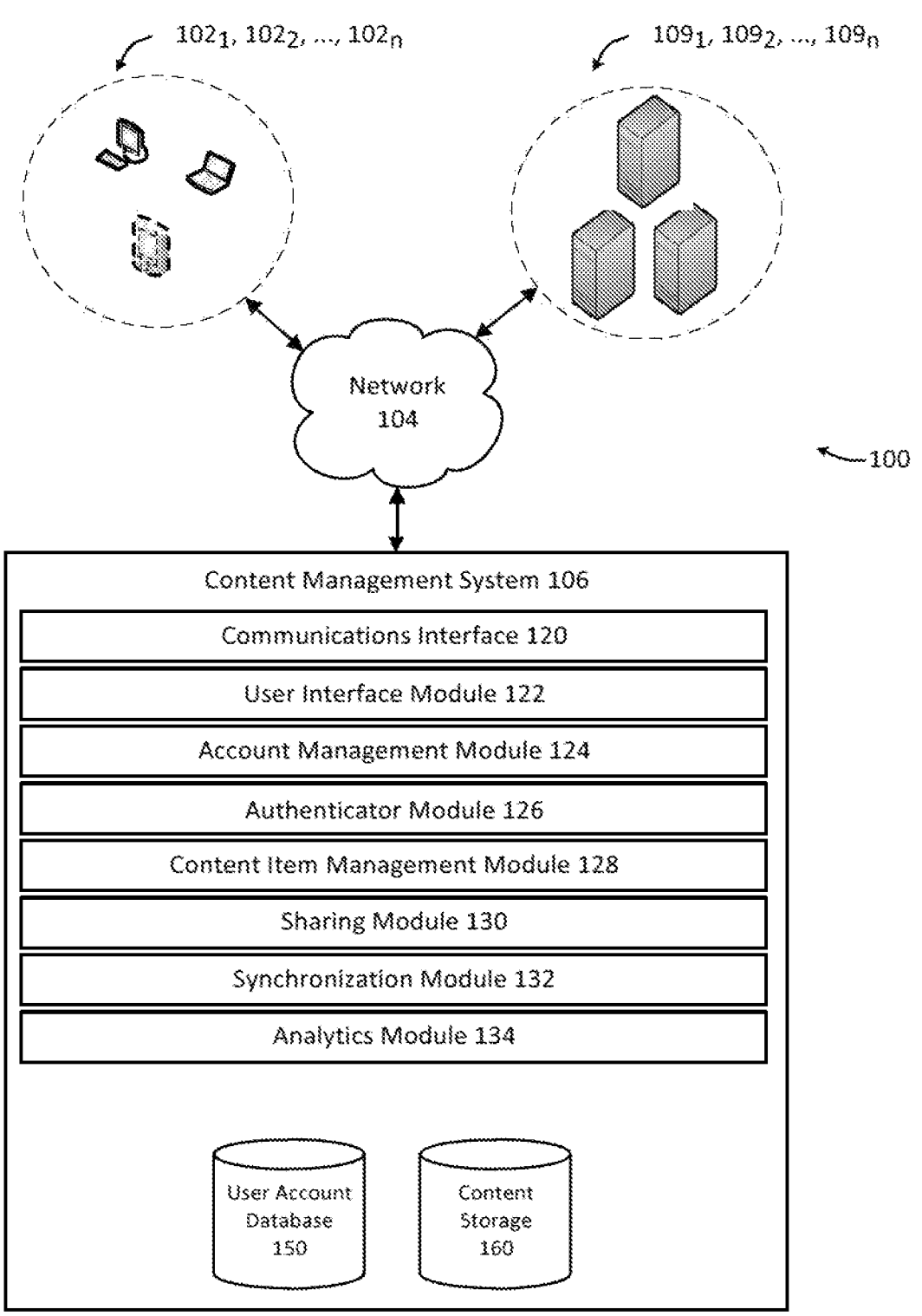
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, . . . , $102_a$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device 102$_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102$_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device 102$_i$ can upload content to content management system 106 via network 104. Later, the same client device 102$_i$ or some other client device 102$_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

In some embodiments, account management module 124 can manage collaboration team accounts. For example, in response to receiving an indication from client device 102$_i$ that the user would like to create a team account, account management module 124 can generate a team account. For example, upon creation of the collaboration team account, the requesting or creating user can become the administrator of the team account. When generating the team account, account management module 124 can allocate resources (e.g., licenses, storage space, access to collaboration tools, etc.) to the team account. A team member can be provided a level of access to the team resources based on whether the team member is a licensed or unlicensed member of the team.

In some embodiments, the team account can be associated with a domain of the administrator. For example, the domain can be a characteristic of the administrator or administrator's content management system account that other users of content management system 106 may have in common with the administrator. For example, the domain can be an email domain (e.g., "company.com"). The domain can be a company name. The domain can be some other identifier or characteristic shared with other users.

In some embodiments, account management module 124 can use the domain of the administrator or team account to discover other users of content management system 106 that may be associated with the collaboration team account. For example, the administrator domain or team domain can be used to search for and find other users of content management system 106 that are associated with the same domain (e.g., same email domain, "company.com"). When found, account management module 124 can invite these other users to join the team account, as described further below.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device 102$_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
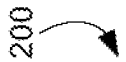
FIG. 2 is a block diagram of an example system for implementing discoverable collaboration teams and/or mixed collaboration teams.

FIG. 2 is a block diagram of an example system 200 for implementing discoverable collaboration teams and/or mixed collaboration teams. For example, system 200 can be configured to allow users of content management system 106 to discover collaboration teams that users might be interested in joining. System 200 can be configured to discover users of content management system 106 that might be interested in joining an existing collaboration team. System 200 can be configured to allow a user (administrator) to create a mixed collaboration team that includes both licensed and unlicensed users of content management system 106.

In some embodiments, system 200 can include administrative device 210. For example, administrative device 210 can correspond to client device 102$_i$ of FIG. 1. A user of administrative device 210 can use content management system (CMS) client 212 to access and/or interact with the user's account and/or content items managed by content management system 106. For example, the user can interact with the content management system 106 via a client-side application integrated with the file system or via a webpage displayed using a web browser application, as described above with reference to FIG. 1. CMS client 212 can be, for example, a web browser that retrieves a web page from content management system 106 through network 104 and presents the web page on a display of administrative device 210. CMS client 212 can be a native application (e.g., software) specifically built to execute in the operating environment (e.g., hardware, operating system, other software, etc.) provided by administrative device 210 and synchronize content items (e.g., files, folders, documents, etc.) stored in managed file system 214 with content management system 106 through network 104.

In some embodiments, CMS client 212 can receive input indicating that the user of administrative device 210 wishes to create a team account in content management system 106. For example, while the user is logged into and viewing a representation of the user's account on content management system 106 through CMS client 212, the user can select a graphical element indicating the user's desire to create a new collaboration team in content management system 106. CMS client 212 can send a request to content management system 106 through network 104 indicating the user's desire to create a new collaboration team account.

In some embodiments, upon receiving the request to create a new collaboration team account, content management system 106 can create collaboration team account 232. Since team account 232 corresponds to and represents a collaboration team, team account 232 and collaboration team 232 will be used interchangeably henceforth. Upon creation of team account 232, content management system 106 can allocate storage space (e.g., 1 TB, 2 TB, etc.) to collaboration team 232 and create team folder 238 to support the team's collaboration efforts. For example, team folder 238 can be a shared folder that can be accessed and/or modified by each authorized member of collaboration team 232. In some embodiments, the user requesting the creation of team account 232 can become the administrator of team account 232. For example, after team account 232 is created for the user of administrative device 210, the user of administrative device 210 becomes the administrator of collaboration team account 232.

In some embodiments, content management system 106 can receive settings for collaboration team 232. For example, the administrator can provide input to CMS client 212 specifying settings for collaboration team 232. The settings can include discoverability settings that allow other users of content management system 106 to discover and/or join collaboration team 232. For example, the administrator of collaboration team 232 can provide information (e.g., an email address, a company name, etc.) to content management system 106 through CMS client 212 specifying a domain (e.g., email domain, company identifier, etc.) for collaboration team 232. The administrator can specify an automatic discovery option that allows other users of content management system 106 associated with the specified domain to be automatically notified that collaboration team 232 exists and automatically join collaboration team 232. The administrator can specify an automatic discovery option that allows other users of content management system 106 associated with the specified domain to be automatically notified that collaboration team 232 exists and request to join collaboration team 232. In some embodiments, the administrator can specify a setting that allows users to join collaboration team 232 by invitation only.

In some embodiments, content management system 106 can receive team license settings. For example, the administrator of collaboration team 106 can provide input to CMS client 212 to purchase licenses 234 (e.g., use licenses, feature licenses, premium account licenses, etc.) for collaboration team 106. The administrator can interact with CMS client 212 to distribute licenses to members of collaboration team 232. The number of licenses purchased may be fewer than the total number of members on collaboration team 232. Thus, collaboration team 232 may include licensed member accounts 236 and/or unlicensed member accounts 237. For example, licensed member account 236 and unlicensed member account 237 may have different levels of access to the shared content management system resources (e.g., storage space, shared folders, collaboration tools, etc.) available to or assigned to collaboration team 232.

In some embodiments, system 200 can include member device 250. For example, member device 250 can correspond to client device 102$_i$ of FIG. 1. Member device 250 can include CMS client 252. For example, CMS client 252 can be a browser application or native application similar to CMS client 212, described above. A user of member device 250 can interact with CMS client 252 to create, view and/or interact with user account 240 in content management system 106, as described above. When created, user account 240 can, for example, be associated with a domain (e.g., email domain, company name, etc.). For example, the user associated with user account 240 can provide an email address (e.g., bob@company.com) when creating user account 240. The domain of the email address (e.g., "company.com") can be the domain of user account 240. Content management system 106 can determine whether to invite the user corresponding to user account 240 to join collaboration team 232 based on the domain of user account 240, as described in more detail below.

In some embodiments, member device 250 can include team folder 256. For example, member device 250 can include managed file system 254 managed by CMS client 252 and content management system 106 and corresponding to user account 240. If the user of member device 250 corresponding to user account 240 joins collaboration team 232, content management system 106 can share team folder 238 corresponding to collaboration team 232 with user account 240 in content management system 106. When team folder 238 is shared with user account 240, content management system 106 can synchronize team folder 238 with member device 250 thereby causing CMS client 252 to create team folder 256 corresponding to team folder 238 in managed file system 254. Content management system 106 and CMS client 252 can interact through network 104 to synchronize content items stored in team folder 238 in content management system 106 with team folder 256 on member device 250. Thus, the user of member device 250 can collaborate with other members of collaboration team 232 through the locally stored and synchronized team folder 256 and/or the remote team folder 238 shared with user account 240 in content management system 106.

Figure 3:
FIG. 3 illustrates an example graphical user interface for creating a new collaboration team.

FIG. 3 illustrates an example graphical user interface 300 for creating a new collaboration team. For example, graphical user interface (GUI) 300 can correspond to a web page of content management system 106 received by CMS client 212 and presented by CMS client 212 on a display of administrator device 210. In some embodiments, when the user of administrator device 210 interacts with the user's account in content management system 106, content management system 106 can prompt the user to create a new collaboration team account by causing graphical element 302 to be presented on GUI 300 displayed on administrator device 210. For example, graphical element 302 can be a window, overlay, notification or other graphical element for prompting the user of administrator device 210 to create a new collaboration team.

In some embodiments, graphical element 302 can include text prompting the user to create a new collaboration team. The text can include a prompt to verify the user's email address so that the appropriate team domain can be determined and/or confirmed by content management system 106. Graphical element 302 can include graphical element 304 (e.g., a hyperlink, URL, button, etc.) that when selected by the user causes content management system 106 to send an email to the user's email account to verify the user's email address. Upon receipt of the email, the user can select a link in the email that notifies content management system 106 that the user received the email at the user's email address, thereby verifying the email provided to content management system 106 by the user is the correct email account for the user.

In some embodiments, graphical element 302 can include informational element 306 that identifies other users of content management system 106 that are associated with the same domain as the user of administrator device 210. For example, if the user of administrator device 210 is associated with the email domain "company.com", then content management system 106 can determine which other users (e.g., user accounts) of content management system 106 have email addresses corresponding to the "company.com" email domain and list those users, or a subset of those users, in informational element 306.

In some embodiments, graphical element 302 can include graphical element 308 that when selected indicates the user's intent or desire to create a new collaboration team. For example, graphical element 308 can be a button, link, or other graphical element presented on GUI 300. When the user of administrator device 210 selects graphical element 308, CMS client 232 can send a request to content management system 106 to create a new team based on the user's content management system account (e.g., based on the user's domain).

Figure 4:
FIG. 4 illustrates an example graphical user interface for configuring a new collaboration team.

FIG. 4 illustrates an example graphical user interface 400 for configuring a new collaboration team. For example, GUI 400 can be presented by CMS client 212 on administrator device 210 in response to a user selecting graphical element 308 of FIG. 3. GUI 400 can present graphical element 402 (e.g., a window, overlay, etc.) that allows the user to specify options for the new collaboration team. For example, graphical element 402 can include a text field 404 that allows the user to specify a name (e.g., "Awesome") for the new collaboration team. Graphical element 402 can include a text field 406 that allows the user to specify identifiers (e.g., names, email addresses, etc.) for other users that the user of administrator device 210 wishes to invite to join the new collaboration team. In some embodiments, graphical element 402 can present graphical element 407 suggesting potential team members for the new collaboration team. The user can, for example, select graphical element 407 to see a full list of suggested team members that match the administrator user's domain. In some embodiments, the administrator user can select which of the selected team members should be invited to join the new collaboration team from the suggested team members.

In some embodiments, graphical element 402 can present automatic member discovery options for the new collaboration team. For example, graphical element 402 can include a selectable option 408 that, when selected by the team administrator, allows users associated with the same domain as the new collaboration team (e.g., same domain as the administrator user) to automatically join the new collaboration team. Graphical element 402 can include a selectable option 410 that, when selected by the team administrator, allows users associated with the same domain as the new collaboration team (e.g., same domain as the administrator user) to receive a notification that the new collaboration team exists and request to join the new collaboration team. Graphical element 402 can include a selectable option 412 that, when selected by the team administrator, allows other users of content management system 106 to join the new collaboration team by invitation only.

In some embodiments, graphical element 402 can include graphical element 414 that when selected by a user causes content management system 106 to create a new collaboration team. For example, in response to receiving user input selecting graphical element 414, CMS client 212 can send the team name, list of users to invite to join the team, and/or the team discovery options specified by the user to content management system 106 in a request to create a new collaboration team.

In some embodiments, content management system 106 can create a new collaboration team in response to receiving a new team request from CMS client 232. For example, when content management system 106 receives the request to create a new team from administrator device 210, content management system 106 can convert the user's personal account on content management system 106 into a business or work account on content management system 106. Content management system 106 can create the new collaboration team (e.g., collaboration team 232) based on the user's account information and associate collaboration team 232 with the user's domain, as described above. Content management system 106 can allocate resources to collaboration team 232, such as storage space (e.g., 1 TB, 2 TB, etc.), a shared folder for storing content items for collaboration team 232, licenses for the team, and/or access to collaboration tools (e.g., content creation tools, word processing tools, document editing tools, unified collaboration environment, messaging tools, etc.).

In some embodiments, content management system 106 will assign an administrator role to the user account of the user who requested that collaboration team 232 be created. For example, the administrator account for collaboration team 232 can adjust the discovery settings, license allocations, and other features of collaboration team 232, as described below. In some embodiments, when collaboration team 232 has been allocated licenses (e.g., through purchase), the administrator account will be automatically assigned one of the licenses allocated to collaboration team 232.

In some embodiments, the administrator of collaboration team 232 can have full administrative control over other licensed members of collaboration team 232 while only having limited control over unlicensed members of collaboration team 232. For example, unlicensed members may be allocated resources according to the parameters of the member's individual account rather than the collaboration team account. Unlicensed members, for example, may be restricted to the storage limits of an individual user account instead of being able to access the larger storage allocated to the team account. Thus, the administrator can manage or control the collaboration team resources that licensed team members have access to but the administrator may not have control over the settings, features, options or resources available to an unlicensed member's account.

FIG. 5 illustrates an example graphical user interface 500 for administering collaboration team 232. For example, GUI 500 can be an administrator console presented by CMS client 212 on a display of administrator device 212. In some embodiments, GUI 500 can present information describing each user (e.g., user 502, 504, 506, 508, and/or 510 of content management system 106 associated with collaboration team 232. The user information can include a graphical object (e.g., icon, image, avatar, etc.) representing the user. The user information can include an identifier (e.g., name, handle, etc.) for the user. The user information can include an email address for the user. The user information can include a status of or role assigned to the user (e.g., creator, administrator, member, invited, waiting for approval, etc.). The user information can include the amount of storage space currently used by the user. The user information can include a storage limit for the user. The user information can include an indication of the licensed or unlicensed state of the user.

In some embodiments, GUI 500 can present information for users who are members of collaboration team 232. For example, users 502, 504 and/or 506 can be users who have already joined collaboration team 232. For example, GUI 500 can present information about user 502 that indicates that user 502 is the creator and/or administrator of collaboration team 232. Users 504 and/or 506 are also members of collaboration team 232. As indicated by GUI 500, user 504 is a licensed member of collaboration team 232 while user 506 is an unlicensed member of collaboration team 232.

Since users 502 and/or 504 are licensed members of collaboration team 232, users 502 and/or 504 have access to all resources allocated to collaboration team 232 by content management system 106. In the example of FIG. 5, content management system 106 has allocated 1 TB of storage space to collaboration team 232, thus licensed users 502 and/or 504 have access to the full 1 TB of storage space. Licensed users 502 and/or 504 have full read-write access to team shared folder 238. Licensed users 502 and/or 504 have full use of the collaboration tools (e.g., document editors, content generation tools, file viewers, file editors, etc.) provided to collaboration team 232 by content management system 106.

In contrast to the full privileges given to licensed members 502 and/or 504, unlicensed member 506 has limited access to the resources allocated to collaboration team 232 by content management system 106. For example, content management system 106 may only allow unlicensed member 506 access to a portion of (e.g., fraction of, less than all, etc.) the storage space allocated to collaboration team 232. For example, while licensed members 502 and/or 504 can access and/or use the full 1 TB of storage space allocated to collaboration team 232, unlicensed member 506 may be restricted to using only 2 GB of the allocated team storage space. Further, content management system 106 may only allow unlicensed member 506 read-only access to team shared folder 238, rather than the read-write access enjoyed by licensed members 502 and/or 504. Content management system 106 may not allow unlicensed member 506 access to or use of the collaboration tools available to licensed members 502 and/or 504 or may just allow use of the collaboration tools for viewing content items but not editing content items.

In some embodiments, the administrator of collaboration team 232 can purchase licenses for collaboration team 232. For example, the administrator (e.g., user 502) of collaboration team 232 can purchase licenses for collaboration team 232 by selecting graphical element 518, providing payment information, and finalizing the purchase using a separate GUI (not shown). For example, the administrator can purchase five licenses for collaboration team 232, as described by license status element 516. Since, two of the five licenses have been assigned to team members, license status element 516 can present information indicating that two out of the five (⅖) licenses have been allocated to members of collaboration team 232.

In some embodiments, content management system 106 can automatically assign collaboration team licenses to members of collaboration team 232. For example, content management system 106 can automatically assign one of the licenses allocated to collaboration team 232 to user 502, as indicated by graphical element 512. Graphical element 512 can, for example, indicate the licensed or unlicensed state of the corresponding user. In some embodiments, content management system 106 can automatically assign the remaining licenses allocated to collaboration team 232 to new members of collaboration team 232 as new members join collaboration team 232. For example, content management system 106 can automatically assign licenses to new members on a first-come-first-served basis. Content management system 106 can automatically assign licenses to new members based on the type of personal or individual account the new member had before joining collaboration team 232. For example, if the user paid for an individual license (e.g., a pro user, business user, etc.) before joining collaboration team 232, content management system 106 can automatically assign the user a team license, if one is available, when the user becomes a member of collaboration team 232.

In some embodiments, content management system 106 will automatically assign licenses to new members according to how the new members join collaboration team 232. For example, if a new member automatically joins collaboration team 232, then content management system 106 can add the new member to collaboration team 232 as an unlicensed member by default. If the new member is invited to join collaboration team 232, the team administrator can specify whether the new member should be a licensed or unlicensed member when inviting the new member to join the team. When the administrator specifies that the invited user should receive a license, content management system 106 can automatically assign the invited user a license when the user accepts the invitation to join collaboration team 232. When a user requests to join collaboration team 232, the administrator user can specify whether to assign the user a license when approving the request. Content management system 106 can then assign the new member a license according to the administrator's specification.

In some embodiments, the administrator of collaboration team 232 can assign, allocate, and/or reallocate licenses to members of the team by interacting with graphical element 514. For example, the administrator user 502 can select graphical element 514 (e.g., a pull-down menu, toggle, etc.) to change the user 506 from an unlicensed user to a licensed user, if a license is available. If user 506 is a licensed user, the administrator user 502 can select graphical element 514 to change the user 506 from a licensed user to a licensed user (e.g., to make a license available for allocation to another member).

In some embodiments, GUI 500 can present information for prospective members of collaboration team 232. For example, GUI 500 can present information for user 508 who has been invited to join collaboration team 232. Since user 508 has not yet accepted or rejected the invitation to join collaboration team 232, GUI 500 can present the information for user 508 and indicate that user 508 has been invited to join collaboration team 232. Similarly, user 510 has requested to join collaboration team 232 but administrator user 502 has not yet approved user 510 for membership to collaboration team 232. Thus, GUI 500 presents user information for user 510 since user 510 is a prospective member. Administrator user 502 can approve the membership request of user 510 by selecting graphical element 520 (e.g., a button, pull-down menu, toggle, etc.). Administrator user 502 can reject the membership request of user 510 by selecting graphical element 522. For example, selecting graphical element 522 can cause the corresponding member or prospective member to be removed from collaboration team 232.

In some embodiments, GUI 500 can present graphical element 524 for inviting users to join collaboration team 232. Administrator user 502 can invite users to join collaboration team 232 when creating collaboration team 232, as described above. Administrator user 502 can invite users to join collaboration team 232 by selecting graphical element 524. For example, when graphical element 524 is selected, CMS client 212 can present a GUI that allows administrator user 502 to specify (e.g., by email address, user identifier, etc.) users to invite to join collaboration team 232. After specifying the users to invite, CMS client 212 can send the list of users to content management system 106 and content management system 106 can send emails to each specified user inviting the users to join collaboration team 232.

In some embodiments, GUI 500 can present graphical element 526 for adjusting the settings of collaboration team 232. For example, administrator user 232 can select graphical element 526 to cause CMS client 212 to display an options GUI for collaboration team 232. The options GUI can receive input from administrator user 502 to change the name of collaboration team 232. The options GUI can receive input from administrator user 502 to change the automatic discovery settings (e.g., automatic join, request to join, etc.) of collaboration team 232. The options GUI can receive input from administrator user 502 to adjust the resources allocated to collaboration team 232. For example, the options GUI can allow administrator user 502 to request more storage space (e.g., increase available storage from 1 TB to 3 TB). The options GUI can allow administrator user 502 to request access to additional collaboration tools. For example, the options GUI can allow administrator user 502 to adjust the terms of the licenses allocated to collaboration team 232 to give collaboration team 232 access to additional or different resources. In response to receiving new settings for collaboration team 232, CMS client 212 can send the new settings to content management system 106 and content management system 106 can change the settings for collaboration team 232 according to the specified settings.

In some embodiments, administrator user 502 may have limited control over unlicensed member accounts. For example, administrator user 502 may be able to modify settings associated with licensed member accounts but not unlicensed member accounts. In some embodiments, when administrator user 502 modifies the settings for collaboration team 232, the new settings may only affect licensed users. For example, when administrator user 502 increases the storage space allocated to collaboration team 232, licensed member 504 can use the storage space up to the new 2 TB limit while unlicensed member 506 may still only have access to the 2 GB storage available to unlicensed members. In some embodiments, unlicensed member account 506 can be treated as if it is an individual member account, thus, other than approving and/or removing unlicensed members of collaboration team 232, administrator user 502 may not have control over the settings of unlicensed member accounts.

Figure 6:
FIG. 6 illustrates an example graphical user interface for prompting a user of a content management system to join a collaboration team.

FIG. 6 illustrates an example graphical user interface 600 for prompting a user of content management system 106 to join collaboration team 232. For example, GUI 600 can be presented by CMS client 252 on a display of member device 250. For example, a user of member device 250 can use CMS client 252 to log into the user's account on content management system 106. When content management system 106 detects the user login, content management system 106 can determine the user's domain (e.g., email domain, company identifier, etc.) and determine if a collaboration team has been created that corresponds to the user's domain. For example, if the user's email domain is "company.com" then content management system 106 can determine if any existing collaboration teams use the same email domain.

In some embodiments, content management system 106 can determine that the domain of collaboration team 232 corresponds to the user's domain and can present graphical element 602 on GUI 500 to invite or prompt the user of member device 150 to join collaboration team 232. For example, when creating collaboration team 232, the creator (e.g., administrator, user of administrator device 210, etc.) can select an automatic discovery option for collaboration team 232. The team creator can specify that users of content management system associated with the same domain as collaboration team 232 can automatically join collaboration team 232. The team creator can specify that users of content management system associated with the same domain as collaboration team 232 can automatically discover collaboration team 232 and request to join collaboration team 232. When content management system 106 determines that a user having the same domain as collaboration team 232 has logged into content management system 106 and that collaboration team 232 allows users to automatically join or request to join collaboration team 232, content management system 106 can cause graphical element 602 to be presented on a display of member device 150 using graphical user interface 600. Thus, content management system 106 can automatically discover users of content management system 106 that may be interested in joining collaboration team 232 and users of content management system 106 can automatically discover a collaboration team that the users may be interested in joining.

In some embodiments, the creator of collaboration team 232 can specify that membership to collaboration team 232 is by invitation only. When the creator specifies that membership is by invitation only, content management system 106 (e.g., through CMS client 252) will only present graphical element 602 to users of content management system 106 that have been invited to join collaboration team 232. In some embodiments, the creator of collaboration team 232 can invite other users of content management system 106 regardless of domain.

In some embodiments, graphical element 602 can include graphical element 604 for verifying the user's domain. For example, the user of member device 250 can select graphical element 604 (e.g., a link, hyperlink, URL, etc.) to cause content management system 106 to send a verification email to the user's email account. The email can, for example, include a link, hyperlink, URL, etc., that the user can select or use to confirm the user's domain (e.g., email address). Upon selecting of the link in the email, member device 150 and/or the user's email server can send a confirmation message to content management system 106 confirming the user's domain.

In some embodiments, graphical element 602 can include graphical element 606 describing the current members of collaboration team 232. For example, the current members can include coworkers of the user of member device 250. If the user recognizes that some coworkers have already joined collaboration team 232 the user may be more likely to join collaboration team 232.

In some embodiments, graphical element 602 can include graphical element 608 for joining collaboration team 232. For example, when graphical element 602 is presented on the display of member device 250, the user of member device 250 can select graphical element 608 to join collaboration team 232. CMS client 252 can send a request to content management system 106 to join the user of member device 150 to collaboration team 232.

Upon receipt of the join request, content management system 106 can add the user to collaboration team 232. For example, content management system 106 can give the user access to the resources of collaboration team 232 according to the user's licensed or unlicensed status, as described above. Content management system 106 can convert the user's personal account on content management system 106 to a work account. Content management system 106 can add team shared folder 238 to the user's account on content management system 106. Content management system 106 can synchronized team shared folder 238 with member device 150. For example, content management system 106 can communicate with CMS client 252 to cause CMS client 252 to create team folder 256 corresponding to shared team folder 248 in managed file system 254 on member device 250. Thus, when other members of collaboration team 232 create or modify content items in shared team folder 238, the user of member device 250 can view, edit, modify, comment on, and/or otherwise collaborate on the content items stored in team shared folder 238 and/or synchronized with team folder 256.

FIG. 7 illustrates an example graphical user interface 700 for presenting a representation of a team folder in a user's account on content management system 106. For example, GUI 700 can be presented on a display of member device 250 by CMS client 252. In some embodiments, GUI 700 can present representations of content items (e.g., folders, documents, files, images, etc.) stored in the user's account on content management system 106. For example, when the user of member device 250 is a member of collaboration team 232, GUI 700 can include graphical element 702 representing team shared folder 238 corresponding to collaboration team 232.

In some embodiments, graphical element 702 can include information describing team shared folder 238 and/or the user's membership to collaboration team 232. For example, graphical element 702 can include a graphical object (e.g., icon, image, etc.) representing team shared folder 238. Graphical element 702 can include the name of collaboration team 232 (e.g., "Awesome") and/or the name of team shared folder 238 (e.g., "Awesome Team Folder").

In some embodiments, graphical element 702 can include a description of the user's membership to collaboration team 232. For example, the description can describe the type of membership (e.g., limited, full) and/or the resource limits and/or restrictions applied to the user's membership. The user's membership to collaboration team 232 can be a limited membership (e.g., unlicensed membership) that has limited access to the resources allocated by content management system 106 to collaboration team 232. The user's membership to collaboration team 232 can be a full membership (e.g., licensed membership) that has full access to the resources allocated by content management system 106 to collaboration team 232.

In some embodiments, graphical element 702 can include information describing the user's permissions with respect to team shared folder 238. For example, when the user's membership is limited, graphical element 702 can indicate that the user has read-only access to team shared folder 238. Read-only access may allow the user to view the contents of and updates to team shared folder 238 but may prevent the user from making any modifications and/or additions to team shared folder 238 and the content items stored therein. When the user's membership is a full membership, graphical element 702 can indicate that the user has read-write access to team shared folder 238. Read-write access may allow the user to view the contents of and updates to team shared folder 238 and also allows the user to make modifications and/or additions to team shared folder 238 and the content items stored therein.

FIG. 8 is a flow diagram of an example process 800 for implementing discoverable collaboration teams. For example, content management system 106 can perform process 800 to automatically determine which users of content management system 106 are associated with a domain corresponding to a collaboration team in content management system 106 and prompt these users to join the collaboration team. Process 800 allows content management system 106 to discover new members for a collaboration team based on common domain. Process 800 allows users of content management system 106 to discover teams to which they may belong based on a common domain.

At step 802, content management system 106 can receive an indication that a first user wishes to create a collaboration team. For example, CMS client 212 on administrator device 210 can receive user input indicating that the user (i.e., the first user) of administrator device 210 would like to create a new collaboration team. In response to receiving the user input, CMS client 212 can send a request to content management system 106 to create a new collaboration team. The request can include a name for the collaboration team and/or a team discovery option specified by the first user.

At step 804, content management system 106 can obtain a domain associated with the first user. For example, content management system 106 can obtain an email address or business name associated with the content management system account of the first user. Content management system 106 can determine the first user's domain based on the email domain of the first user's email address. For example, the first user's domain can correspond to the email domain of the first user's email address. Content management system 106 can determine the first user's domain based on the company name obtained from the first user's account. For example, the first user's domain can correspond to the company name or company identifier obtained from the first user's account.

At step 806, content management system 106 can obtain a team discovery setting specified by the first user. For example, content management system 106 can obtain the team discovery setting from the new team request received from CMS client 212. The team discovery setting can indicate that users of content management system 106 can join the collaboration team by invitation only, automatically when the domain of a user matches the domain of the collaboration team, or by requesting membership to the collaboration team when the domain of a user matches the domain of the collaboration team.

At step 808, content management system 106 can allocate resources to the new collaboration team. For example, content management system 106 can create a new team account for the requested collaboration team (e.g., collaboration team 232). Content management system 106 can allocate licenses to collaboration team 232 (e.g., based on how many licenses were purchased by the first user). Content management system 106 can allocate storage space to collaboration team 232. Content management system 106 can create a shared team folder that can be distributed to team members and synchronized across team member accounts. Content management system 106 can store the user-specified team discovery settings obtained at step 806 in the new team account for collaboration team 232.

At step 810, content management system 106 can determine that a second user is associated with the domain of collaboration team 232. For example, the first user may have created collaboration team 232 using the email domain "@company.com". Content management system 106 can determine that the second user has an account with content management system 106 that uses the email domain "@company.com". Content management system can determine that the second user's domain corresponds to the domain of collaboration team 232 by determining that the second user's email domain matches the email domain used for collaboration team 232.

At step 812, content management system 106 can prompt the second user to join collaboration team 232 based on the team discovery settings for collaboration team 232. For example, when the settings for collaboration team 232 indicate that membership to collaboration team 232 is by invitation only, content management system 106 can prompt the second user to join collaboration team 232 when the first user has previously sent the second user an invitation to join collaboration team 232. When the settings for collaboration team 232 indicate that membership to collaboration team 232 is automatic for users of content management system 106 associated with the same domain as collaboration team 232, content management system 106 can prompt the second user to join collaboration team 232 when the second user's account is associated with the same domain (e.g., email domain) as collaboration team 232. When the settings for collaboration team 232 indicate that users of content management system 106 associated with the same domain as collaboration team 232 can request membership to collaboration team 232, content management system 106 can prompt the second user to join collaboration team 232 when the second user's account is associated with the same domain (e.g., email domain) as collaboration team 232. For example, content management system 106 can prompt the second user to join collaboration team 232 by causing graphical element 602 of FIG. 6 to be presented on a display of member device 250.

At step 814, content management system 106 can receive an indication that the second user wishes to join collaboration team 232. For example, the second user can select graphical element 608 of GUI 600 presented by CMS client 252 on a display of member device 250 to indicate the second user's wish to join collaboration team 232, as described above. In response to receiving the selection of graphical element 608, CMS client 252 can send a message indicating that the second user wishes to join collaboration team 232 to content management system 106.

At step 816, content management system 106 can join the second user to collaboration team 232 according to the team discovery setting of collaboration team 232. For example, if the second user received an invitation from the first user to join collaboration team 232, content management system 106 can join the second user to collaboration team 232 without further approval by the first user (e.g., the administrator of collaboration team 232). If the second user's account is associated with the same domain as collaboration team 232 and the team discovery settings indicate that users with the same domain as collaboration team 232 can automatically join collaboration team 232, content management system 106 can join the second user to collaboration team 232 without further approval by the first user. If the second user's account is associated with the same domain as collaboration team 232 and the team discovery settings indicate that users with the same domain as collaboration team 232 can request to join collaboration team 232, content management system 106 can join the second user to collaboration team 232 when the first user approves the membership request of the second user.

At step 818, content management system 106 can provide the second user access to the resources of collaboration team 232. For example, content management system 106 can add the shared team folder of collaboration team 232 to the second user's account on content management system 106. Content management system 106 can allow the user to access the storage space allocated to collaboration team 232. Content management system 106 can allow the user to use the collaboration tools available to collaboration team 232. The second user's access to team resources may be restricted according to the type of membership the second user has in the team. For example, if the second user is an unlicensed member of collaboration team 232, the second user may have restricted or limited access to the resources of collaboration team 232. If the second user is a licensed member of collaboration team 232, the second user may have full access to all of the resources allocated to collaboration team 232.

FIG. 9 is a flow diagram of an example process 900 for implementing mixed teams on content management system 106. For example, process 900 allows content management system 106 to manage collaboration teams (e.g., collaboration team 232) having a mix of licensed and unlicensed members. Process 900 allows for improved flexibility in collaboration teams when creators of the collaboration teams may not be able to afford to buy licenses for each member of a collaboration team. Process 900 can improve the adoption of or participation in collaboration teams by not requiring that a use license be purchased for each member of the collaboration team.

At step 902, content management system 106 can store information describing members of collaboration team 232. For example, content management system 106 can create a collaboration team account for collaboration team 232. The collaboration team account can include data identifying users of content management system 106 that are members of collaboration team 232. The collaboration team account can include information describing the number of licenses allocated to and/or purchased for collaboration team 232. The collaboration team account can include information indicating the resources (e.g., amount of storage, access to collaboration tools, etc.) allocated to collaboration team 232.

At step 904, content management system 106 can assign licenses to members of collaboration team 232. For example, content management system 106 can automatically assign licenses to members of collaboration team 232 based on when members join (e.g., first-come-first-serve), whether the member paid for a license before joining collaboration team 232, or some other criteria. Content management system 106 can assign licenses to members based on input received from the administrator of collaboration team 232 indicating which members should be assigned licenses and which members should not be assigned licenses.

At step 906, content management system 106 can determine that a first member of collaboration team 232 has been assigned a team license. For example, the collaboration team account information can indicate that the first member of collaboration team 232 has been assigned a license. Content management system 106 can determine that the first member is a licensed member based on the collaboration team account information indicating that the first user has been assigned a license.

At step 908, content management system 106 can provide the first member a first level of access to collaboration team resources. For example, because the first member of collaboration team 232 has been assigned one of the licenses allocated to collaboration team 232, the first member can be allowed full access to all of the content management system resources allocated to collaboration team 232. The first member can access or use all of the storage space allocated to collaboration team 232. The first member can access all of the collaboration tools made available to collaboration team 232. The first member can be granted read-write access to shared team folder 238. Thus, since the first member of collaboration team 232 is a licensed member, the first member is given a high level (e.g., full level) of access to the resource allocated to collaboration team 232.

At step 910, content management system 106 can determine that a second member of collaboration team 232 has not been assigned a team license. For example, the collaboration team account information can indicate that the second member of collaboration team 232 has not been assigned a license. Content management system 106 can determine that the second member is a not licensed member based on the collaboration team account information indicating that the second user has not been assigned a license.

At step 912, content management system 106 can provide the second member a second level of access to collaboration team resources. In some embodiments, the second level of access provided to the second member can be lower (e.g., restricted, less than, etc.) that the first level of access provided to the first member. For example, while the licensed first member has full access to all of the resources allocated to collaboration team 232, the unlicensed second member has restricted or limited access to the resources of collaboration team 232.

For example, the second member may only have access to 2 GB of storage space while the first member has access to the full 1 TB of storage space allocated to collaboration team 232. The second member may only have read-only access to the team folder of collaboration team 232 while the first member has read-write access to the team folder of collaboration team 232. The second member may not have access to one or more of the collaboration tools made available to collaboration team 232 while the first member may have access to all of the collaboration tools of collaboration team 232. The first level of access granted to the first user may allow the first user to specify a password and/or expiration date for links to shared content while the second level of access granted to the second user may not be able to set a password and/or expiration date to shared content.

Although the first member and the second member may have different levels of access to the resources allocated to collaboration team 232, the first member and the second member of collaboration team 232 can still collaborate on projects, content items, documents, etc. For example, when the first user creates or modifies a content item and stores the content items in the team folder, the second member can view the content item and provide feedback to the first member. Thus, mixed teams provide an environment for collaboration while also providing flexibility in the makeup of the team and the expense required to work within the collaborative environment provided by collaboration teams in content management system 106.

Figure 10A:
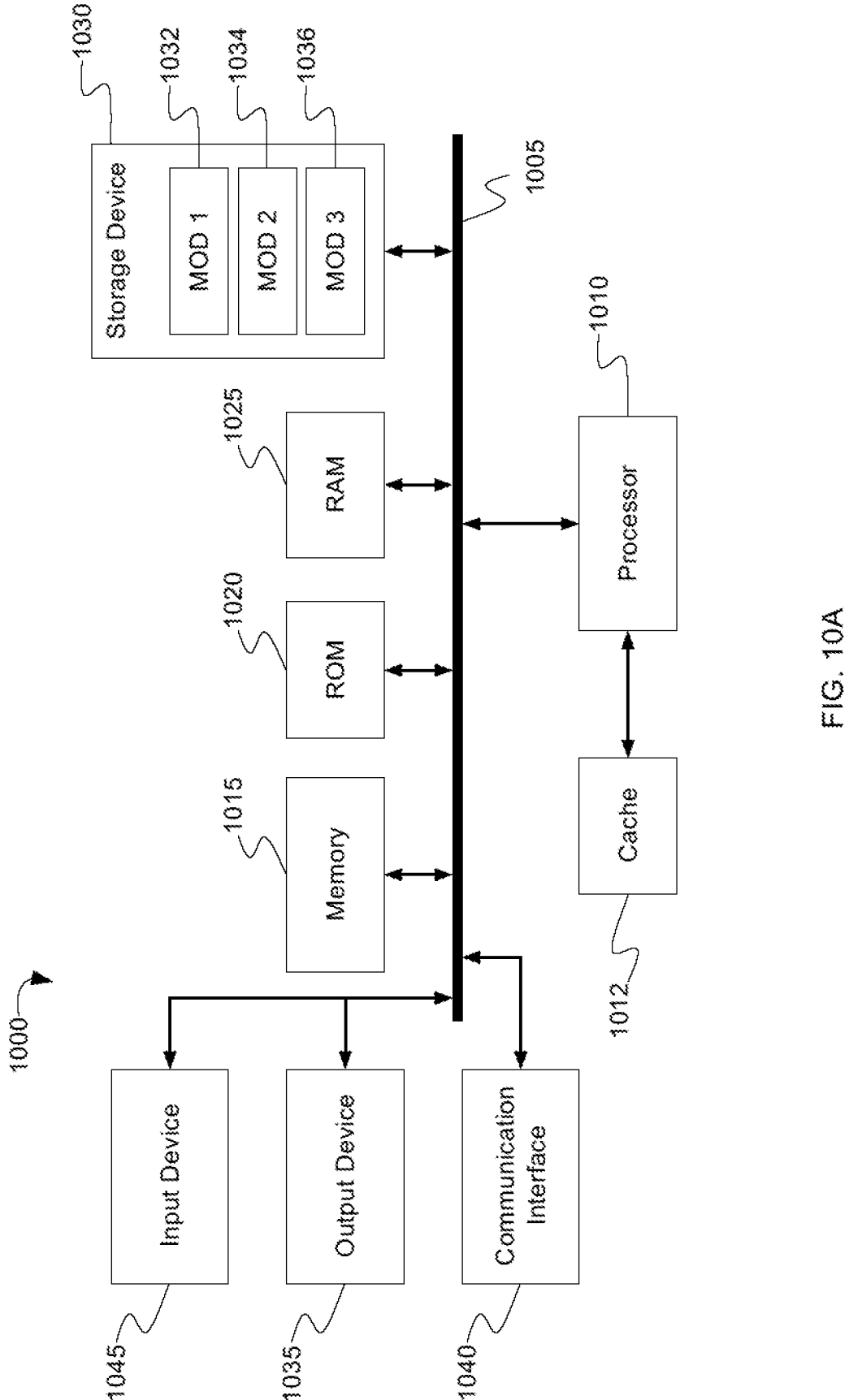
FIG. 10A shows an example possible system embodiment for implementing various embodiments of the present technology.
Figure 10B:
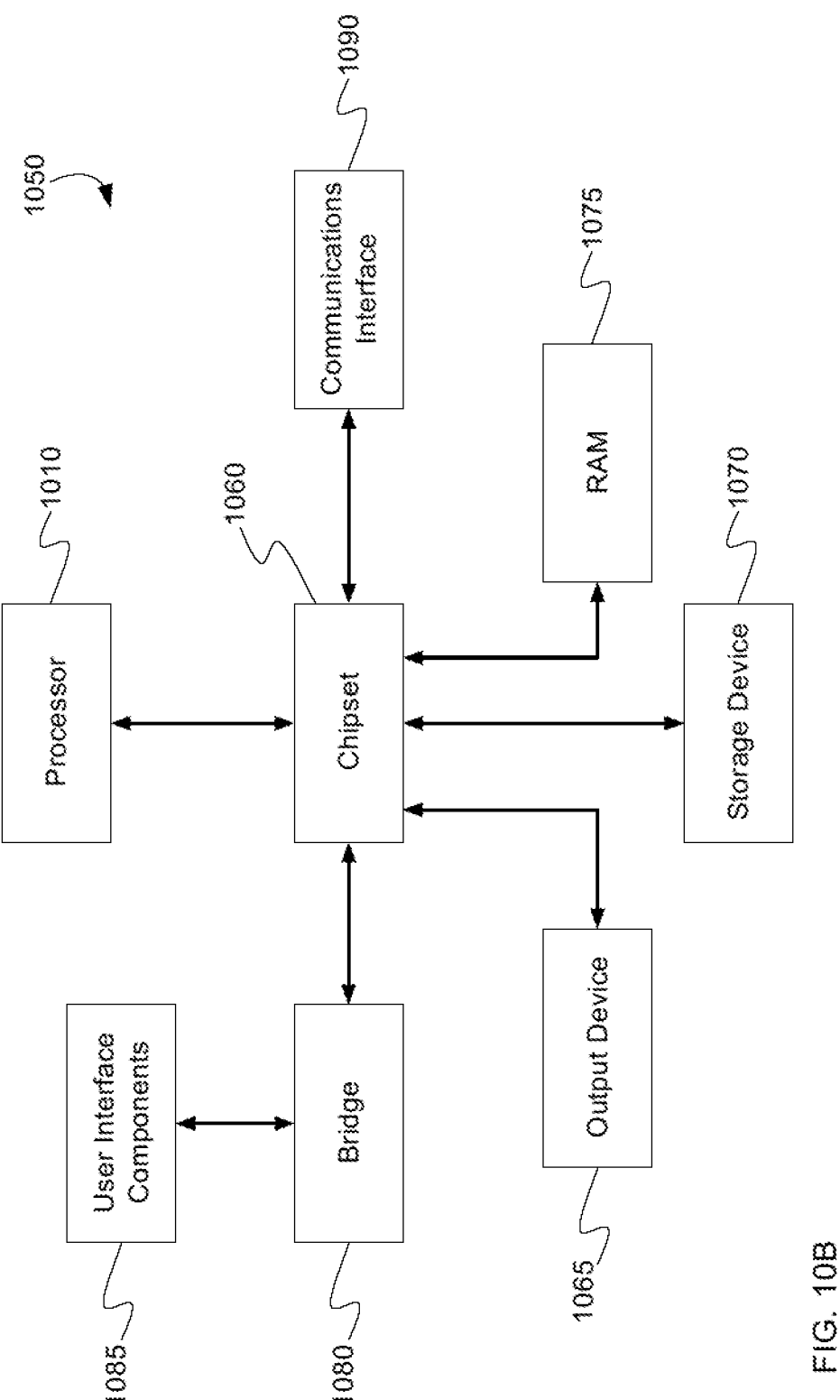
FIG. 10B shows an example possible system embodiment for implementing various embodiments of the present technology.

10A and FIG. 10B show example possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Example system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1010, representative of any number of physically and/or logically distinct resources capable of executing software, firmware, and hardware configured to perform identified computations. Processor 1010 can communicate with a chipset 1060 that can control input to and output from processor 1010. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1010 analyzing data stored in storage 1070 or 1075. Further, the machine can receive inputs from a user via user interface components 1085 and execute appropriate functions, such as browsing functions by interpreting these inputs using processor 1010.

It can be appreciated that example systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

receiving, by a content management system, a request from a user account of a user device to create a collaboration team having a shared team folder;

assigning, by the content management system, a first email domain to the collaboration team as a team domain, the team domain being used for automatic discovery of additional user accounts associated with the collaboration team;

detecting, by the content management system, that a first user has logged into a first user account managed by the content management system from a client device;

determining, by the content management system, that the first user account is associated with a second email domain corresponding to the team domain;

based on the determination that the second email domain of the first user account corresponds to the team domain, prompting, by the content management system, the first user to join the collaboration team;

providing, by the content management system, the first user account with a first team license from a plurality of team licenses allocated to the collaboration team, wherein the first team license permits assignment of a first access level of a plurality of access levels to the user account;

providing, by the content management system, access to the shared team folder corresponding to the collaboration team in accordance with the first access level from the plurality of access levels; and causing, by the content management system, synchronization of the shared team folder with a content management system client executing on the client device in accordance with the first access level.

2. The method of claim 1, wherein assigning, by the content management system, the first email domain to the collaboration team as the team domain comprises:

determining, by the content management system, an email domain corresponding to the user account initiating the request for the collaboration team; and setting, by the content management system, the email domain corresponding to the user account as the team domain.

3. The method of claim 1, wherein assigning, by the content management system, the first email domain to the collaboration team as the team domain comprises:

determining, by the content management system, a characteristic associated with the user account initiating the request for the collaboration team; and generating, by the content management system, the first email domain based on the characteristic associated with the user account.

4. The method of claim 3, wherein determining, by the content management system, that the first user account is associated with the second email domain corresponding to the first email domain comprises:

determining, by the content management system, a second characteristic associated with the first user account; and determining, by the content management system, that the second characteristic associated with the first user account matches the characteristic associated with the user account.

5. The method of claim 1, further comprising:

providing an indication that the first user account is an unlicensed account.

6. The method of claim 5, wherein the first access level is a lower access level than a second access level provided to licensed accounts associated with the collaboration team.

7. A method comprising:

receiving, by a content management system, a request from a user account of a user device to create a collaboration team having a shared team folder;

assigning, by the content management system, a first email domain to the collaboration team as a team domain, the team domain being used for automatic discovery of additional user accounts associated with the collaboration team;

detecting, by the content management system, that a first user has logged into a first user account managed by the content management system from a client device;

determining, by the content management system, that the first user account is associated with a second email domain corresponding to the team domain;

based on the determination that the second email domain of the first user account corresponds to the team domain, prompting, by the content management system, the first user to join the collaboration team;

providing, by the content management system, the first user account with a first team license from a plurality of team licenses allocated to the collaboration team based on the team domain, wherein the first team license permits assignment of a first access level of a plurality of access levels to the user account:

providing, by the content management system, access to the shared team folder corresponding to the collaboration team; and causing, by the content management system, synchronization of the shared team folder with a content management system client executing on the client device.

8. The method of claim 7, wherein assigning, by the content management system, the first email domain to the collaboration team as the team domain comprises:

determining, by the content management system, an email domain corresponding to the user account initiating the request for the collaboration team; and setting, by the content management system, the email domain corresponding to the user account as the team domain.

9. The method of claim 7, wherein assigning, by the content management system, the first email domain to the collaboration team as the team domain comprises:

determining, by the content management system, a characteristic associated with the user account initiating the request for the collaboration team; and generating, by the content management system, the first email domain based on the characteristic associated with the user account.

10. The method of claim 9, wherein determining, by the content management system, that the first user account is associated with the second email domain corresponding to the first email domain comprises:

determining, by the content management system, a second characteristic associated with the first user account; and determining, by the content management system, that the second characteristic associated with the first user account matches the characteristic associated with the user account.

11. The method of claim 7, wherein assigning, by the content management system, the first email domain to the collaboration team as the team domain comprises:

determining, by the content management system, an identifier associated with the user account initiating the request for the collaboration team; and generating, by the content management system, the first email domain based on the identifier associated with the user account.

12. The method of claim 11, wherein determining, by the content management system, that the first user account is associated with the second email domain corresponding to the first email domain comprises:

determining, by the content management system, a second identifier associated with the first user account; and determining, by the content management system, that the second identifier associated with the first user account matches the identifier associated with the user account.

13. The method of claim 7, wherein detecting, by the content management system, that the first user has logged into the first user account managed by the content management system from the client device comprises:

responsive to assigning the first email domain to the collaboration team, initiating, by the content management system, an automatic discovery process to identify other user accounts having email domains that match the first email domain.

14. A method comprising:

receiving, by a content management system, a request from a user account of a user device to create a collaboration team having a shared team folder, wherein the collaboration team includes a team domain, the team domain being used for automatic discovery of additional user accounts associated with the collaboration team;

detecting, by the content management system, that a first user has logged into a first user account managed by the content management system from a client device;

prompting, by the content management system, the first user to join the collaboration team based on the first user account being associated with the team domain;

providing, by the content management system, the first user account with a first team license from a plurality of team licenses allocated to the collaboration team based on the team domain, wherein the first team license permits assignment of a first access level of a plurality of access levels to the user account;

providing, by the content management system, access to the shared team folder corresponding to the collaboration team in accordance with the first access level from the plurality of access levels; and causing, by the content management system, synchronization of the shared team folder with a content management system client executing on the client device in accordance with the first access level.

15. The method of claim 14, further comprising:

determining, by the content management system, that the first user account is an unlicensed account.

16. The method of claim 15, wherein the first access level is a lower access level than a second access level provided to licensed accounts associated with the collaboration team.

17. The method of claim 16, wherein the second access level provides user accounts with access to a greater number of collaboration team resources than the first access level.

18. The method of claim 16, wherein the first access level has read-only access and the second access level has read-write access.

* * * * *